United States Patent [19]
Miyaguchi et al.

[11] Patent Number: 5,809,838
[45] Date of Patent: Sep. 22, 1998

[54] BALL SCREW DEVICE WITH MEANS FOR MAINTAINING BALANCE

[75] Inventors: Kazuo Miyaguchi; Daisuke Kuroiwa, both of Gunma, Japan

[73] Assignee: NSK Ltd., Tokyo, Japan

[21] Appl. No.: 874,345

[22] Filed: Jun. 13, 1997

Related U.S. Application Data

[63] Continuation of Ser. No. 453,816, May 30, 1995, abandoned.

[51] Int. Cl.$^6$ ............................................. F16H 25/22
[52] U.S. Cl. ...................... 74/459; 74/89.15; 74/424.8 R
[58] Field of Search ............................. 74/424.8 R, 459, 74/89.15

[56] References Cited

U.S. PATENT DOCUMENTS

| | | |
|---|---|---|
| 3,046,808 | 7/1962 | DeMart . |
| 3,064,758 | 11/1962 | Ohrnberger . |
| 3,145,580 | 8/1964 | Galonska et al. ........................ 74/459 |
| 4,557,156 | 12/1985 | Teramachi ................................ 74/459 |
| 4,604,911 | 8/1986 | Teramachi . |
| 4,680,982 | 7/1987 | Wilke et al. ........................ 74/424.8 R |
| 4,939,946 | 7/1990 | Teramachi ............................. 74/89.15 |
| 5,228,353 | 7/1993 | Katahira et al. ...................... 74/89.15 |
| 5,373,755 | 12/1994 | Rohlinger ................................ 74/459 |

FOREIGN PATENT DOCUMENTS

| | | |
|---|---|---|
| 0538991 | 4/1993 | European Pat. Off. . |
| 1625527 | 7/1970 | Germany . |
| 6300107 | 10/1994 | Japan ....................................... 74/459 |
| 2215428 | 9/1989 | United Kingdom . |

OTHER PUBLICATIONS

"Beaver Ball Screw Technical Handbook A Basic Guide to the Design Factors, Application and Selection of All Bearing Screw", Prepared by Beaver Precision Products, Inc., B–8 10M ML:Nov. 1966.

*Primary Examiner*—Rodney H. Bonck
*Assistant Examiner*—Troy Grabow
*Attorney, Agent, or Firm*—Sughrue, Mion, Zinn, Macpeak & Seas, PLLC

[57] ABSTRACT

In a ball screw device which provides a screw shaft including a ball screw groove in the outer peripheral surface, a ball nut including a ball screw groove formed in the inner peripheral surface opposite to the ball screw groove of the screw shaft, a plurality of balls fitted between the ball screw grooves of the screw shaft and ball nut, and a tube type circulation path for circulating these balls, the ball screw device can reduce the moment of inertia of a rotary portion of the device so as to facilitate the use of the ball screw device of a nut rotation type. Further, the ball screw device further provides an oil supplying structure which includes a first oil supplying hole formed in the outer race of the rolling bearing and passing through the outer race from the outer peripheral surface thereof to the inner peripheral surface thereof, and a second oil supplying hole formed in the ball nut, passing through the ball nut from the outer peripheral surface thereof to the inner peripheral surface thereof and also communicating with the first oil supplying hole through an annular gap. The oil supplying structure can supply oil even while the ball screw device is in operation, and eliminate the mounting and removal of an oil supplying pipe when supplying the oil.

7 Claims, 9 Drawing Sheets

BALL SCREW DEVICE WITH MEANS FOR MAINTAINING BALANCE

This is a Continuation of application Ser. No. 08/453,816 filed May 30, 1995 now abandoned.

BACKGROUND OF THE INVENTION

The present invention relates to an improved ball screw device of a nut rotation type which is used to move linearly a table and the like employed in a machine requiring a relatively long stroke such as a machine tool, a wood working machine, a laser working machine, an electronic part mounting machine, a long stroke delivery machine or the like in particular, the invention relates to an improved ball screw device which can be used by rotating a ball nut thereof while a screw shaft thereof is fixed. Further, the present invention relates to an oil supplying structure in the ball screw device of the nut rotation type.

Conventionally, a ball screw device is such structured so that a ball nut including a ball screw groove in the inner peripheral surface thereof is in threaded engagement with a screw shaft including a ball screw groove on the outer peripheral surface thereof through a large number of balls. The ball nut includes an endless circulation circuit for the balls. And, the ball screw device is used to move a table or the like, on which the ball nut is mounted, in the axial direction thereof by spirally rotating the screw shaft and ball nut relative to each other.

In connection with the above-mentioned relative spiral movements of the screw shaft and ball nut, there are known two main rotation types, that is, a screw shaft rotation type and a ball nut rotation type. In particular, in the screw shaft rotation type, the screw shaft is rotatably supported through a rolling bearing or the like and, if the screw shaft is rotationally driven, then the ball nut is not rotated but is moved in the axial direction thereof. On the other hand, in the ball nut rotation type, the screw shaft is fixedly supported at the two ends thereof, the ball nut is rotatably supported through a rolling bearing or the like, and the ball nut can be moved in the axial direction thereof while it is being driven rotationally. When the latter type or the ball nut rotation type is employed in the ball screw device, especially, since the screw shaft has a great length, the moment of inertia of the rotation thereof is greater than that of the ball nut. That is, the ball screw device of a ball nut rotation type can be used advantageously when the screw shaft easily vibrates. Because the screw shaft cannot be rotated, it can be supported at the intermediate portion thereof relatively easily and thus it is easy to prevent dangerous vibration of the screw shaft. For example, the ball screw device of a ball nut rotation type can be used as a feed screw mechanism for a machine requiring a long feed distance such as a wood working machine, a laser working machine, an electronic part mounting machine or the like.

In general, as the screw shaft increases in the length the moment of inertia of the screw shaft increases and, therefore, it is disadvantageous to use the ball screw device of the screw shaft rotation type, whereas it is advantageous to use the ball screw device of the ball nut rotation type.

Figure 19:
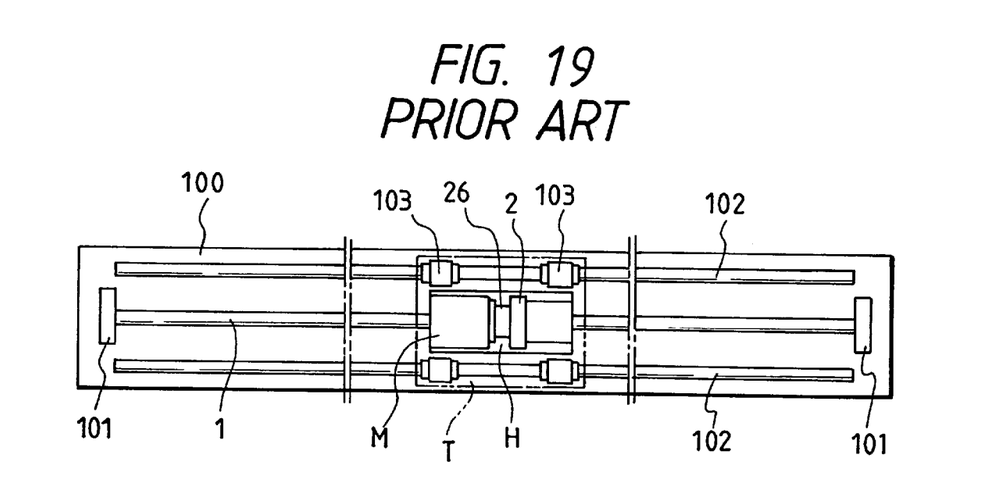
FIG. 19 is a plan view of a general ball screw device to which the present invention is applied.

In FIG. 19, there is shown an embodiment of the above-mentioned type of conventional ball screw device of a ball nut rotation type. That is, a screw shaft 1 is unrotatably supported such that the two ends thereof are fixed to a base 100 by two shaft fixing blocks 101, 101 respectively mounted to the base 100. Two guide rails 102, 102 are arranged in parallel to the screw shaft 1, with the screw shaft 1 between them, and are also fixed to the base 100. Two sliders 103 are fitted on each of the guide rails 102 in such a manner that they are freely slidable in the axial direction of the guide rail 102. A table T is placed on and fixed to the sliders. A ball nut 2 is mounted on the bottom of the table T in such a manner that it is rotatably supported by a housing H, and the ball nut 2 is connected through a timing belt 26 to a motor M which is connected to the inner surface of the housing H.

The ball nut 2 can be rotated by driving the motor M. Since the screw shaft 1 is unrotatably fixed, the ball nut 2 itself is rotated and is moved along the screw shaft 1. As a result of this, the table T is moved smoothly in the axial direction while it is being guided by the sliders 103.

Figure 16:
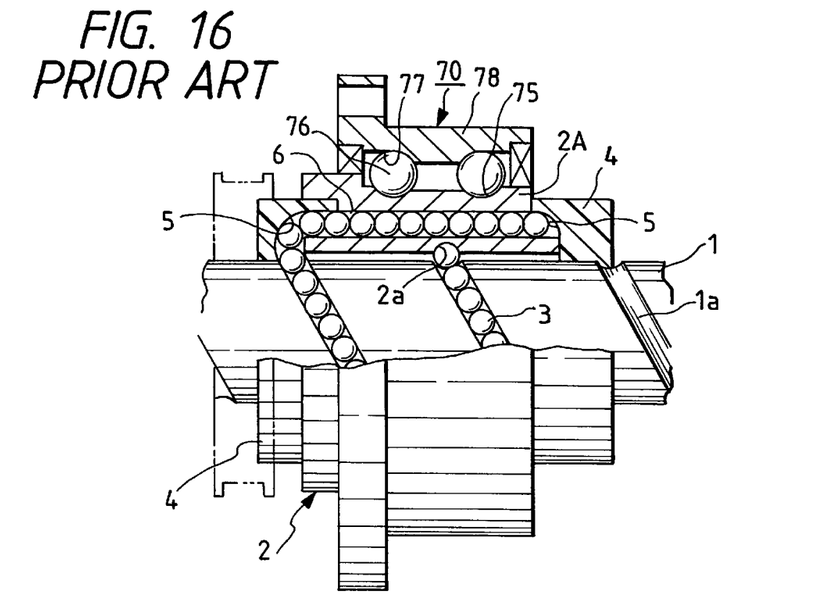
FIG. 16 is a partially sectional plan view of an end cap type of a conventional ball screw device.

As the ball screw device as shown in FIG. 19 in which the screw shaft is fixed and the ball nut can be rotated, conventionally, there is solely used a ball screw device of an end cap type shown in FIG. 16. In this type of ball screw device, two end caps 4 are respectively provided on the two ends of a nut main body 2A of a ball nut which can be threadingly engaged with a screw shaft 1 through balls 3, and each end cap 4 includes therein a U-shaped curved path serving as a ball circulation path. The balls 3 move rollingly between a ball screw groove 1a formed in the outer periphery of the screw shaft 1 and a ball screw groove 2a formed in the inner periphery of the ball nut 2 to the end portion of the ball nut main body 2A. Here, the balls 3 make a U turn while they are guided by the curved path 5 in one end cap 4, move into a ball return path 6 formed in the ball and nut main body 2A to extend in the axial direction thereof, move rollingly in the ball return path 6 to climb over the ball screw grooves 1a, 2a and reach the opposite end portion thereof, are guided into the other end cap 4, and make a reversed U turn and return to their original positions. And, this circulatory movement is repeated.

The ball nut main body 2A is rotatably supported through a plurality of rolling elements 76 by a bearing outer race 78 including an inner race ball groove 75 of a support bearing 70 in the outer periphery thereof and an outer race ball groove 77 in the inner periphery thereof, while the ball nut can be rotated smoothly.

Figure 17:
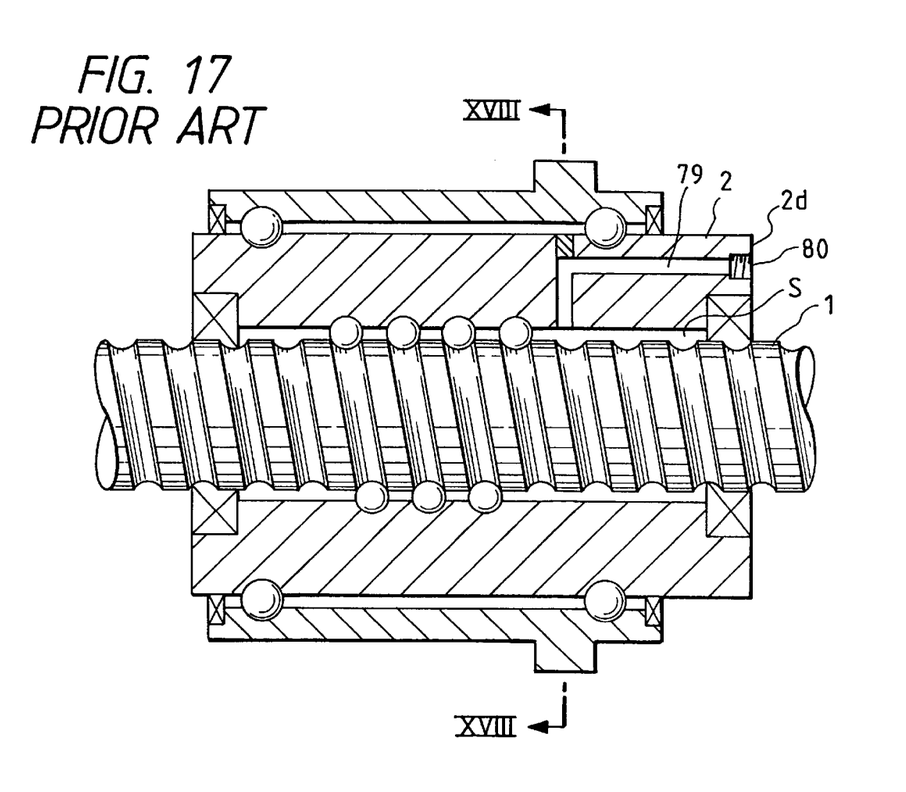
FIG. 17 is a longitudinal section view of an oil supplying structure of the conventional ball screw device.
Figure 18:
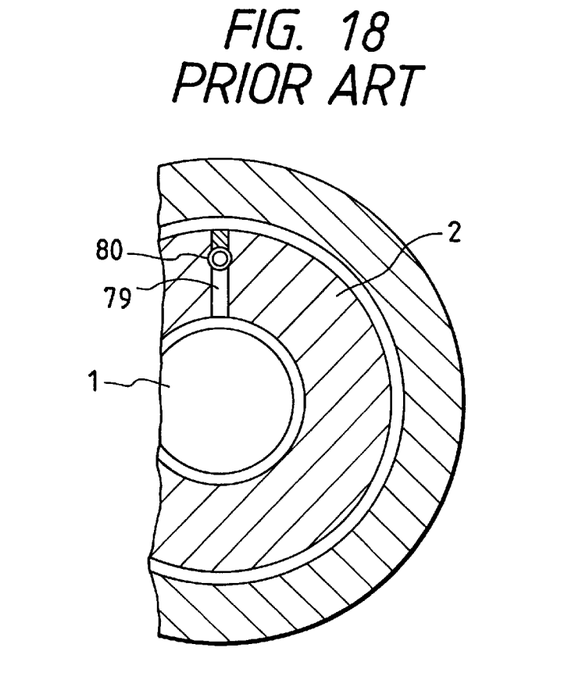
FIG. 18 is a partially omitted section view taken along the line XVIII—XVIII shown in FIG. 17.

In the operation of the ball screw device, a large number of balls interposed between the screw shaft and ball nut roll repeatedly. In order that the rolling movements of the balls can be achieved smoothly for a long time, it is indispensable to supply a lubricant not only to the ball screw grooves of the screw shaft and ball nut but also to the balls rolling between the ball screw grooves. As a conventional oil supplying structure for a conventional ball screw device of a nut rotation type, there is known such a structure as shown in FIGS. 17 and 18. In this structure, an opening 80 is formed in one end face 2d of a ball nut 2 in the axial direction thereof in threaded engagement with a screw shaft 1 to thereby provide an oil supplying path 79 which is allowed to communicate with a gap S formed between the screw shaft 1 and ball nut 2, and a lubricant can be supplied to the gap S from an oil supplying pipe (not shown) connected through a pipe joint (not shown) mounted to the joint screw of the opening 80.

However, since the ball screw device of the end cap type is used by rotating the ball nut, it is difficult to reduce the outside diameter of the ball nut in terms of design. This makes it impossible to set the moment of inertia of the ball nut rotary portion of the ball screw device to be small and, therefore, a load inertia on a drive motor is inevitably increased, which results in the lower response of the nut rotation with respect to the drive motor and thus in the deterioration of table positioning accuracy.

Further, in the above-mentioned conventional oil supplying structure of the ball screw device, since the oil supplying path 79 is formed in the rotatably supported ball nut 2 and the lubricant is supplied from the opening 80 formed in the ball nut end face 2d, the oil supplying pipe cannot be connected during the rotation of the ball nut 2. Therefore, oil supply is possible only while the ball screw device stands still and, if there arises the need for oil supply during the operation of the ball screw device, the operation of the ball screw device must be stopped for oil supply. Also, the oil supplying pipe must be mounted and removed for each oil supply operation.

SUMMARY OF THE INVENTION

The present invention aims at eliminating the drawbacks found in the above-mentioned conventional ball screw device. Accordingly, it is an object of the invention to provide a ball screw device of a ball nut rotation type, which can reduce the moment of inertia of the rotary portion thereof to provide good response of the nut rotation with respect to a drive motor and improve table positioning accuracy and table feed speed. Further, it is another object of the invention to provide an oil supplying structure in a ball screw device which is capable of supplying oil even while the ball screw device of the nut rotation type is in operation, and eliminates the need to mount and remove an oil supplying pipe for each oil supply.

In attaining the above objects, according to a first aspect of the present invention, there is provided a ball screw device of a ball nut rotation type, which includes a screw shaft having a ball screw groove formed on the outer peripheral surface thereof, a ball nut formed in the inner periphery thereof a ball screw groove opposite to the ball screw groove of the screw shaft, a large number of balls fitted between the ball screw grooves of the ball shaft and ball nut for permitting the spiral movement of the ball nut with respect to the screw shaft, and a tube type circulation path for circulating these balls.

According to a second aspect of the present invention, there is provided a ball screw device which includes a screw shaft that is fixedly supported and has a ball screw groove formed in the outer peripheral surface thereof, a ball nut including in the inner peripheral surface thereof a ball screw groove formed disposed to the ball screw groove of the screw shaft and including an inner raceway of a rolling bearing in the outer peripheral surface thereof, the ball nut being rotatably supported by a fixed outer race of the rolling bearing through rolling elements fitted within the inner raceway of the rolling bearing, and a large number of balls fitted between the ball screw grooves of the screw shaft and ball nut for permitting the mutual spiral movements of the screw shaft and ball nut with respect to each other, characterized by a first oil supplying hole formed in the fixed outer race of the rolling bearing in such a manner that it extends in the radial direction of the fixed outer race and it also passes through the fixed outer race from the outer peripheral surface thereof to the inner peripheral surface, and a second oil supplying hole formed in the ball nut in such a manner that it passes through the ball nut from the outer peripheral surface thereof to the inner peripheral surface thereof and communicates with the first oil supplying hole through an annular gap.

According to a third aspect of the present invention, there is provided a ball screw device which includes a screw shaft supported in a fixed manner and having a ball screw groove formed in the outer peripheral surface thereof, a ball nut including a ball screw groove formed in the inner peripheral surface thereof opposite to the ball screw groove of the screw shaft and also including an inner raceway of a rolling bearing in the outer peripheral surface thereof, the ball nut being rotatably supported by a fixed outer race of the rolling bearing through rolling elements fitted within the inner raceway, and a large number of balls fitted between the ball screw grooves of the screw shaft and ball nut for permitting the mutual spiral movements of the screw shaft and ball nut with respect to each other, characterized by an outer cover disposed in one end of the fixed outer race of the rolling bearing and including a shaft insertion hole allowing the screw shaft to pass therethrough, and an oil supplying hole passing through the inside diameter surface of the insertion hole for the screw shaft and communicating with a gap formed between the inner peripheral surface of the ball nut and the outer peripheral surface of the screw shaft.

In the ball nut using a tube type circulation path, since a ball return path is formed on the outside of a ball nut main body by use of a tube, the thickness of the body portion of the ball and nut main body can be reduced to some extent. Also, the inner race ball groove of a bearing portion for supporting the ball nut in a freely rotatable manner is formed to the outside of the axial direction of the ball nut main body in order to avoid interference with the circulation tube. As a result of this, although the ball nut main body is lengthened in the axial direction thereof, the moment of inertia J of the rotary portion of the ball nut has the following relationship:

$$J \propto D^4 \times L \tag{1}$$

(where D is the outside diameter thereof and L is the length thereof)

That is, the equation (1) indicates that the amount of decrease in the moment of inertia due to a decrease in the outside diameter of the body portion of the ball nut is substantially larger than the amount of increase in the moment of inertia due to the increased length of the ball nut in the axial direction thereof. Therefore, the moment of inertia of the whole ball nut is reduced to a great extent.

DETAILED DESCRIPTION OF THE PREFERRED EMBODIMENTS

Description will be given below in detail of embodiments of a ball screw device according to the present invention with reference to the accompanying drawings. The same or equivalent parts thereof to a conventional ball screw device or all the embodiments of the present invention, are given the same designations and thus the detailed description thereof is omitted here.

Embodiment 1

Figure 1:
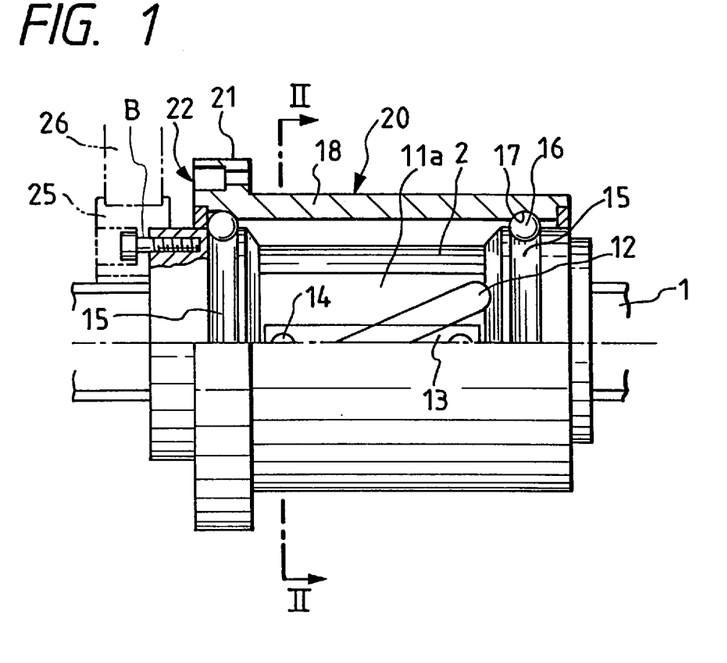
FIG. 1 is a partially broken plan view of a first embodiment of a ball screw device according to the present invention.
Figure 2:
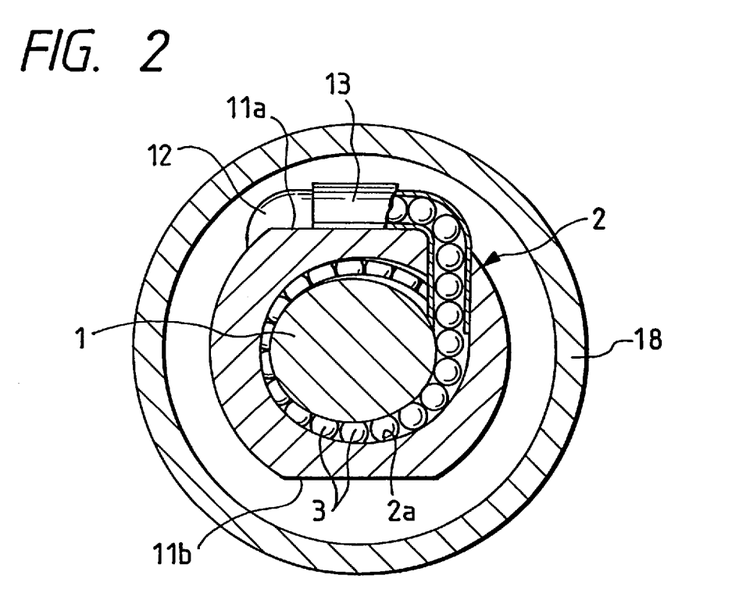
FIG. 2 is a section view taken along the line II—II shown in FIG. 1.
Figure 3:
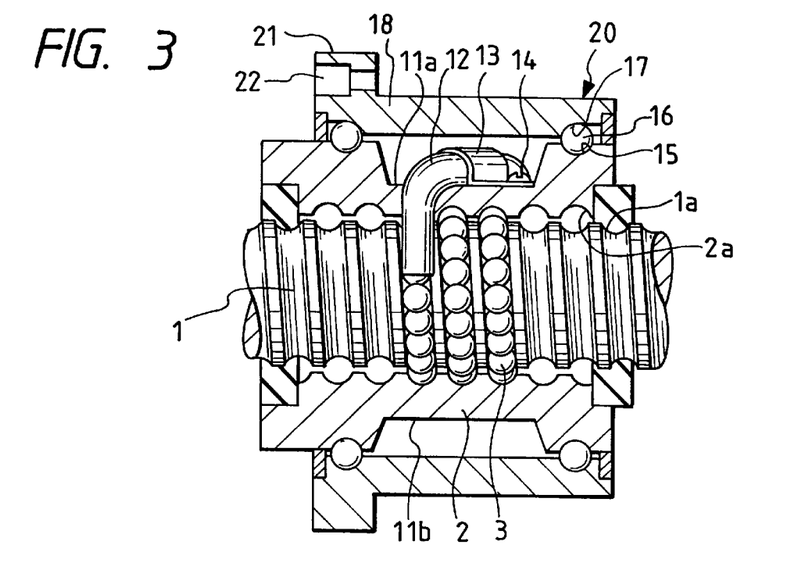
FIG. 3 is a partially longitudinal section view of the first embodiment shown in FIG. 1.

FIGS. 1 to 3 show a first embodiment of a ball screw device according to the present invention.

A ball nut 2 is threadingly engaged with the screw shaft 1. The outside diameter of the central portion of the ball nut 2 is smaller than those of the two end portions thereof, while the side surface of the cylindrical body portion of the ball nut 2 is partially chamfered to thereby provide a flat surface 11a. A circulation tube 12 serving as a tube type circulation path is fixed to the flat surface 11a by a screw 14 through a fixing member 13. That is, the ball nut 2 is a ball nut of a so called projected tube type. In the first embodiment, there is one screw groove 1a of the screw shaft 1 and one screw groove 2a of the ball nut 2 and, for this reason, there is only one circulation tube 12. Also, the cylindrical body portion of the ball nut 2 includes another chamfered flat surface 11b on the opposite side to the flat surface 11a, so that the ball nut 2 is balanced during rotation.

The two end portions of the ball nut 2 are larger in diameter than the central portion thereof, and there are formed two bearing inner race grooves 15 and 15 respectively in the outer peripheral surfaces of the two end portions of the ball nut 2. And, a large number of rolling elements 16 are inserted into the inner race grooves 15 and, at the same time, a bearing outer race 18 has in the inner peripheral surfaces thereof two outer race grooves 17 and 17 serving as the outer raceways of the rolling elements 16 and is mounted on the outside of the ball nut 2, thereby providing a support bearing 20. The support bearing 20 includes a mounting flange 21 on the outer surface thereof which is fixed to a housing (not shown) by inserting a bolt through a screw hole 22 formed in the flange 21, so that the support bearing 20 can support the ball nut 2 in a freely rotatable manner. Also, in the support bearing 20, the distance between the two outer race grooves 17 and 17 is larger than the distance between the inner race grooves 15 and 15 so that a preload is applied to the rolling elements 16.

Figure 4:
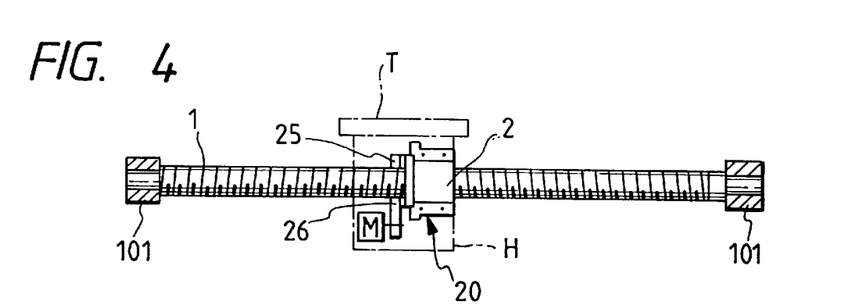
FIG. 4 is a longitudinal side view of the ball screw device of the present invention.

In the ball screw device structured in this manner, as shown in FIG. 4, the two ends of the screw shaft 1 are unrotatably fixed and supported by shaft fixing blocks 101 and 101 respectively. On the other hand, the ball nut 2 is mounted onto a table T of a machine through a housing H by the mounting flange 21 of the support bearing 20. Then, a timing pulley 25 is mounted and fixed by a bolt B to one end (in FIG. 1, the left end) of the ball nut 2 supported rotatably by the support bearing 20 in this manner. Next, a timing belt 26 is provided between the timing pulley 25 and a pulley mounted on a motor M which is provided in the housing H or table T.

If the motor M is driven to rotate the ball nut 2, the table T can be fed in the axial direction of the screw shaft 1. In the rotation of the ball nut 2, since the outside diameter of the ball nut 2 is smaller than that of the conventional ball nut in the most part thereof except for the two end portions thereof, as shown in the above-mentioned equation (1), the moment of inertia of the ball nut 2 is reduced in proportion to the biquadrate of the outside diameter. In fact, in the first embodiment, the moment of inertia of the present ball nut 2 is reduced about 12–16% over the conventional ball nut.

Further, use of the tube type circulation path not only eliminates the need for provision of the ball return path that is employed in the interior of the nut in the end cap type circulation path, but allows the device to adapt itself to a screw having a specific lead simply by changing the length of the circulation tube, thereby being able to minimize effects on the moment of inertia. This can increase the freedom of selection of the diameter of the screw shaft 1 and screw lead and thus can satisfy easily even the requirements for the specific shaft diameter and screw lead.

Moreover, in the conventional end cap type circulation path, the pulley is bolt fastened to the ball nut through the end cap formed of resin. On the other hand, in the first embodiment, the pulley 25 can be fixed directly to the ball nut 2 formed of metal. Therefore, when compared with the conventional end cap type circulation path, the reliability of the fastening of the pulley to the ball nut can be improved in the first embodiment.

Embodiment 2

Figure 5:
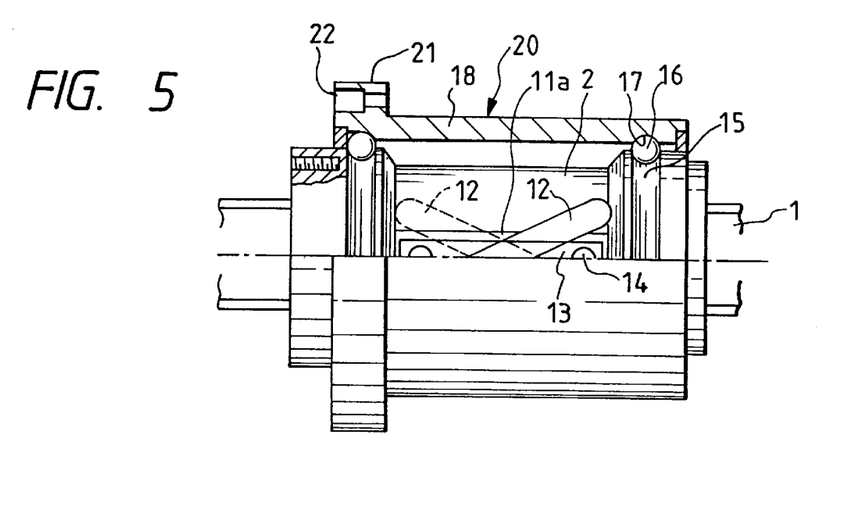
FIG. 5 is a partially broken plan view of a second embodiment according to the present invention.

FIG. 5 illustrates a second embodiment of a ball screw device according to the present invention.

The second embodiment is different from the first embodiment in that each of the screw shaft 1 and ball nut 2 includes two screw grooves and thus two circulation tubes 12 are used, while the circulation tubes 12 are respectively arranged in one chamfered flat surface 11a and in the other chamfered flat surface (disposed on the opposite side to one flat surface 11a but not shown) by a phase angle of 180°. The remaining portions of the structure, operation and effects of the second embodiment are similar to those of the first embodiment.

In the first and second embodiments, as the drive system of the ball screw device, there is shown a system in which the ball nut 2 is connected through the timing belt 26 to the motor M. However, a hollow motor which includes a hollow hole in the shaft core thereof can be used, for example, as shown in FIG. 19. In this case, the hollow motor is mounted to the table T through a bracket, the screw shaft 1 is inserted through the hollow hole in the hollow motor, and the output portion of the hollow motor is connected to the ball nut 2 through a mounting jig.

Also, as the ball circulation tube 12, an ordinary tube which can be formed by bending a circular tube material into a U shape, or, a ball circulation tube of a division type which includes two divisional sections divided by a symmetrical axis extending in the tube axial direction, each divisional section having a semi-arc shape with a U-shaped section, can be used.

Figure 6A:
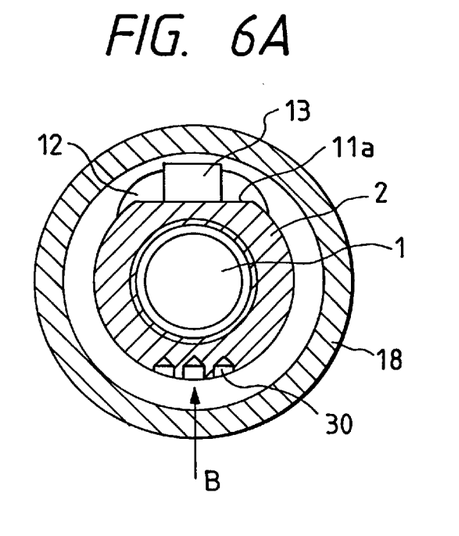
FIG. 6A is a section view of the modification of the first embodiment according to the present invention, corresponding to FIG. 2.
Figure 6B:
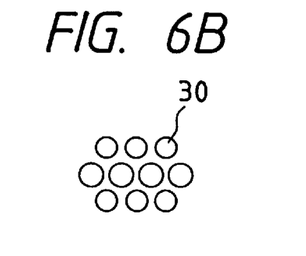
FIG. 6B is a view of a portion of FIG. 6A shown by an arrow B.

Further, in the first embodiment, there is also formed the chamfered flat surface 11b in the body portion of the ball nut on the opposite side to the flat surface 11a, so that the ball nut can be balanced while it is rotating. However, the flat surface 11b can be omitted. That is, as shown in FIGS. 6A and 6B, the balance of the ball nut during the rotation thereof can be secured by forming drilled holes 30.

In addition, in the first and second embodiments, as the rotation drive device, there is shown the device which rotationally drives the ball nut by use of the timing pulley and timing belt. However, the present invention is not limited to this. The ball nut can also be driven or rotated by a sprocket and a chain.

Embodiment 3

Figure 7:
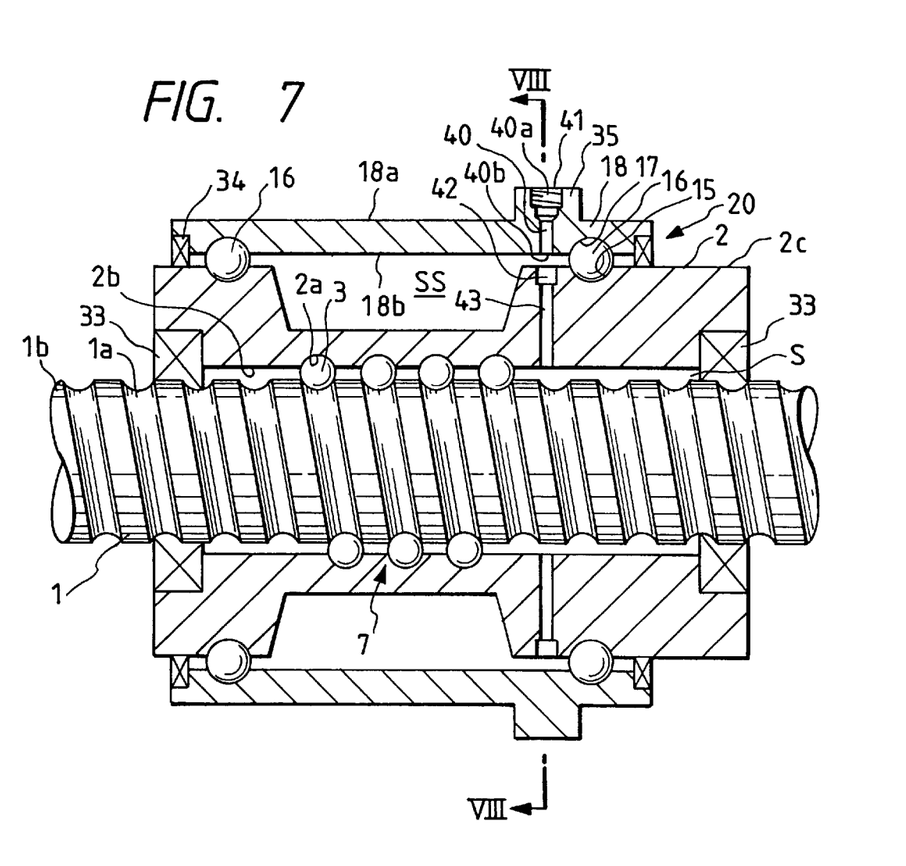
FIG. 7 is a longitudinal section view of a third embodiment of an oil supplying structure of the ball screw device according to the present invention.
Figure 8:
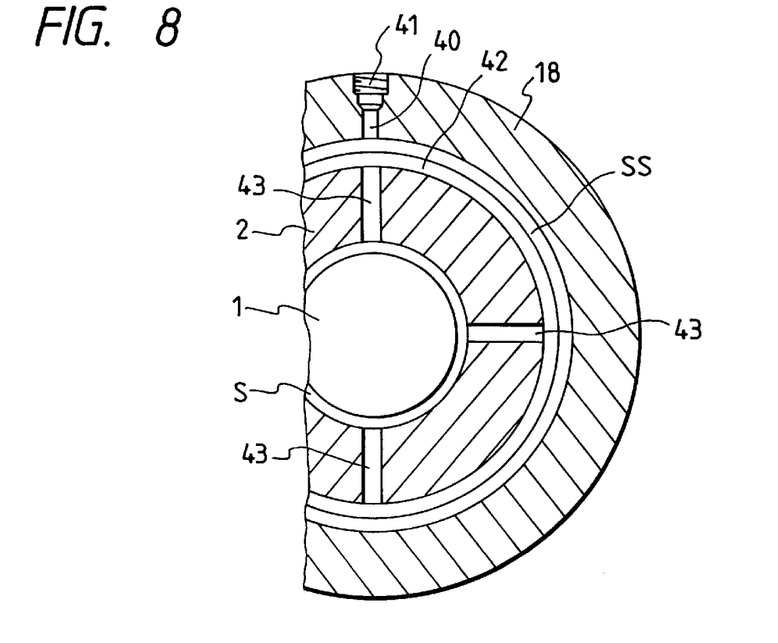
FIG. 8 is a partially omitted section view taken along the line VIII—VIII shown in FIG. 7.

FIGS. 7 and 8 show the structure of a third embodiment of a ball screw device according to the present invention. A s screw shaft 1 includes a spirally shaped ball screw groove 1a in the outer peripheral surface 1b thereof and the two end portions (not shown) of the screw shaft 1 are fixed by a support member or the like, so that the screw shaft 1 is supported unrotatably.

A ball nut 2 includes a ball screw groove 2a disposed in the inner peripheral surface 2b opposite to the ball screw groove 1a of the screw shaft 1 and is in threaded engagement with the screw shaft 1 through a large number of balls 3 loaded in these mutually opposing ball screw grooves 1a and 2a. There are mounted two ball screw seals 33 respectively on the two ends of the inner peripheral surface 2b of the ball nut 2 and the seals 33 hermetically seal a gap S (in which there is stored a ball circulation portion 7 through which the balls 3 are allowed to roll within the ball screw grooves 1a, 2a to thereby perform a circulatory spiral movement) between the screw shaft 1 and ball nut 2. As the type of a ball circulation path (not shown) for allowing the balls, which have made their spiral movements and arrived at one end side of the ball circulation portion 7, to return to the other end side thereof for endless circulation, there are known a tube type in which a circulation tube is mounted on the outer surface of the ball nut 2, an end cap type in which two end caps each including curved circulation path are mounted respectively on the end faces of the ball nut 2 and are connected to a return hole passing through the interior of the ball nut in the axial direction thereof, and the like. Any of these types can be used in the third embodiment.

In particular, the ball nut 2 includes in the outer peripheral surface 2c thereof two inner raceways 15 of a rolling bearing 20 which are spaced apart from each other in the axial direction, so that the ball nut 2 is allowed to serves as the inner race of the rolling bearing as well. The rolling bearing 20 includes an outer race 18 which is so formed as to correspond to the above-mentioned inner race. The outer race 18 includes on the inner peripheral surface 18b thereof two outer raceways 17 which respectively correspond to the two inner raceways 15, while rolling elements 16 are loaded within the mutually opposing inner and outer raceways 15, 17. Also, the outer race 15 of the rolling bearing includes a flange 35 on the outer peripheral surface 18a thereof, the flange 35 fixedly mounting the outer race 18 onto a housing or the like. Therefore, the outer race 18 is referred hereinafter to as a fixed outer race.

On the axial end face of the fixed outer race 18, there is mounted a bearing seal 34 which hermetically seals an annular gap SS formed between the ball nut 2 and fixed outer race 18.

An oil supplying structure of the thus structured ball screw device according to the third embodiment is structured in the following manner: that is, in the fixed outer race 18 of the rolling bearing 20, there is formed a first oil supplying hole 40 which passes radially through the fixed outer race 18 from the outer peripheral surface 18a (in the illustrated embodiment, the outer peripheral surface of the flange 15) of the fixed outer race 18 to the inner peripheral surface 18b thereof. And, in the entrance opening 40a of the outer peripheral surface of the oil supplying hole 40, there is formed a joint mounting screw hole 41 of an oil supplying pipe (not shown). On the other hand, in the outer peripheral surface 2c of the ball nut 2, there is formed an annular oil supplying groove 42 circumferentially extending at an opposite position to the exit opening 40b of the inner peripheral surface 18b of the first oil supplying hole 40, while there is also formed a second oil supplying hole 43 which passes through the ball nut 2 from the bottom of the oil supplying groove 42 to the inner peripheral surface 2b of the ball nut 2. The first oil supplying hole 40 and second oil supplying hole 43 are in communication with each other through the annular gap SS formed between the fixed outer race 18 of the rolling bearing 20 and the ball nut 2 serving as a movable inner race. In the third embodiment, while there is one first oil supplying hole 40, four second oil supplying holes 43 are formed at regular intervals on the outer peripheral surface 2c of the ball nut 2 to thereby supply oil evenly onto the outer periphery of the screw shaft. However, the number of the second oil supplying holes 43 is not limited to four.

Next, description will be given below of the operation of the above-mentioned oil supplying structure.

The fixed outer race 18 of the rolling bearing 20 is fixedly mounted on a table or the like. On the other hand, the ball nut 2 serving as a movable inner race is connected to the output shaft of a drive motor loaded on the table through a belt provided around a pulley (not shown) or the like which is mounted to one end portion of the ball nut 2 projecting from the end face of the fixed outer race 18. By rotating the drive motor, the ball nut 2 can be rotated around the screw shaft 1 through the rolling movements of the rolling elements 16 in such a manner that the ball nut 2 is supported by the fixed outer race 18. Simultaneously with the rotation of the ball nut 2, a large number of balls 3 of the ball screw roll and move spirally within the ball screw grooves 1a and 2a and thereby start to circulate. In this case, since the screw shaft 1 is fixed, the ball nut 2, together with the fixed outer race 18, moves linearly along the screw shaft 1. Thus, the table with the fixed outer race 18 mounted thereon is driven linearly together with the drive motor. By changing the direction of rotation of the drive motor, the table can freely be moved in the advance and retreat directions.

If the oil supplying pipe is connected to the fixed outer race 18 through a joint (not shown) threadingly mounted into the screw hole 41 of the first oil supplying hole 40 in such a manner that it can be moved in the axial direction thereof by a "cable bear" (a trade name) or the like, since the fixed outer race is mounted on the table or the like such that it is fixed unrotatably, the oil supplying pipe can always be left connected and oil can always be supplied to the ball circulation portion 7 of the ball screw as the need arises (even while the ball screw device is in operation) whether the ball nut 2 is being rotated or not. That is, the lubricant can be charged from the oil supplying pipe into the first oil supplying hole 40. The charged lubricant is firstly inserted into the annular gap SS between the inner peripheral surface 18b of the fixed outer race 18 of the rolling bearing 20 and the outer peripheral surface 2c of the ball nut 2. Then, from the annular gap SS, the lubricant is moved through the second oil supplying hole 43 and is supplied to the gap S between the inner peripheral surface 2b of the ball nut 2 and the outer peripheral surface 1b of the screw shaft 1, so that the lubricant is supplied to the ball circulation portion 7 of the ball screw. Even while the ball nut 2 is rotating, the lubricant is able to move from the annular gap SS and reach the ball circulation portion 7 through the second oil supplying hole 43.

Also, in the third embodiment, the lubricant, which has been charged from the first oil supplying hole 40 into the annular gap SS between the fixed outer race 18 and ball nut 2, is also supplied to the rolling element rolling portions of the rolling bearing 20 such as inner raceways 15, outer raceways 17, rolling elements 16 and the like.

Embodiment 4

Figure 9:
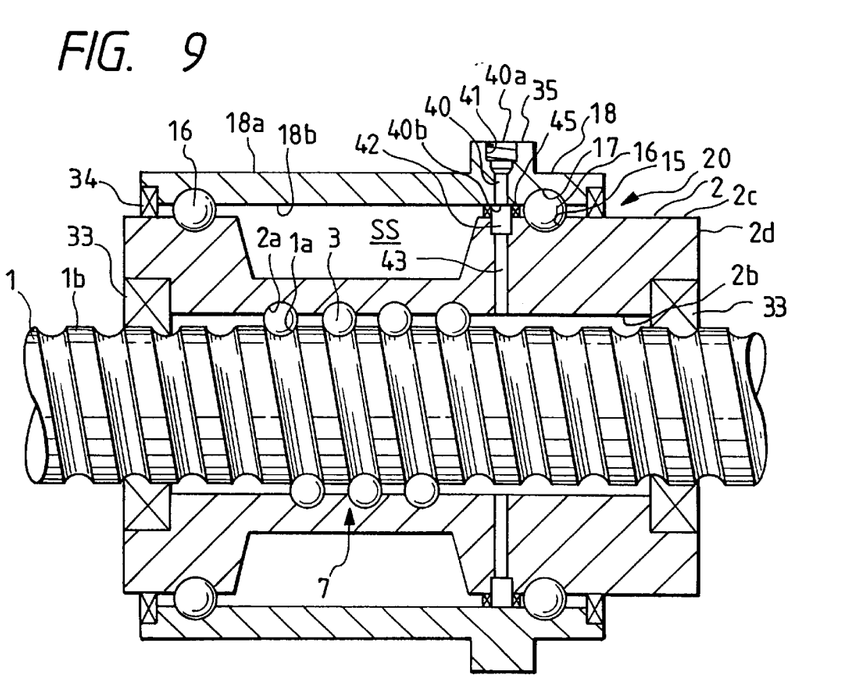
FIG. 9 is a longitudinal section view of a fourth embodiment of the oil supplying structure according to the present invention.

FIG. 9 shows a fourth embodiment of an oil supplying structure of a ball screw device according to the present invention.

In the fourth embodiment, oil is not supplied to the rolling element rolling portions of the rolling bearing 20 including the inner raceways 15, outer raceways 17, rolling elements 16 and the like. Thus, the fourth embodiment is different from the third embodiment in that the open portion between the first and second oil supplying holes 40 and 43 in the annular gap SS is sealed by two seals 45 which are respectively inserted between the outer peripheral surface 2c of the ball nut 2 and the inner peripheral surface 18b of the fixed outer race 18 of the rolling bearing 20.

Such prevention of oil supply to the rolling element rolling portions of the rolling bearing 20 is useful in a lubrication system in which the screw shaft 1 and ball nut 2 of the ball screw device are lubricated with oil or oil mist and, on the other hand, the rolling element rolling portions of the rolling bearing 20 are lubricated with grease.

The remaining portions of the structure, operation and effects of the fourth embodiment are similar to the third embodiment.

Embodiment 5

Figure 10:
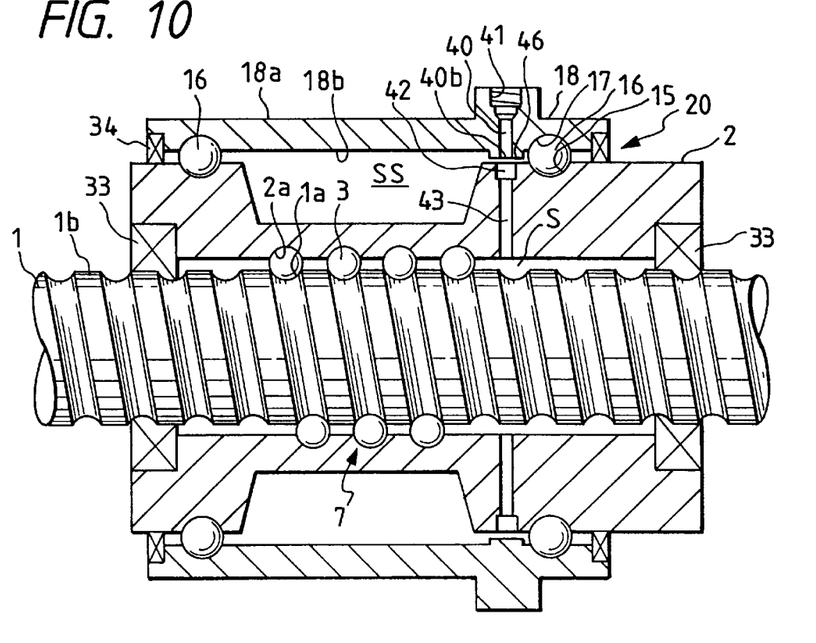
FIG. 10 is a longitudinal section view of a fifth embodiment of the oil supplying structure according to the present invention.

FIG. 10 show a fifth embodiment of an oil supplying structure of a ball screw device according to the present invention.

The fifth embodiment is different from the third embodiment in that an annularly stepped portion 46 projects inwardly at the exit opening 20c of the first oil supplying hole 40 on the inner peripheral surface 18b of the fixed outer race 18 of the rolling bearing 20. Accordingly, since the width of the annular gap SS between the exit opening 40b of the first oil supplying hole 40 and the second oil supplying hole 43 is narrowed, the oil supplying performance of the oil supplying structure to the ball circulation portion 7 of the ball screw can be improved.

The remaining portions of the structure, operation and effects of the fifth embodiment are similar to the third embodiment.

Embodiment 6

Figure 11:
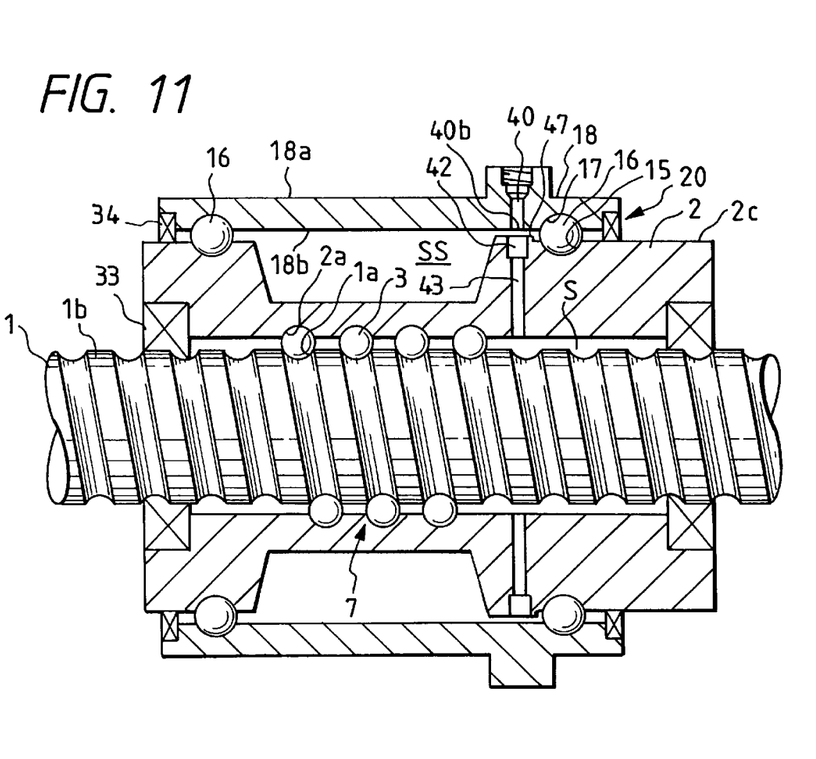
FIG. 11 is a longitudinal section view of a sixth embodiment of the oil supplying structure according to the present invention.

FIG. 11 show a sixth embodiment of an oil supplying structure of a ball screw device according to the present invention.

The sixth embodiment is different from the third embodiment in that, on the outer peripheral surface 2c, an annularly stepped portion 47 projects outwardly at the annular oil supplying groove 42 formed in the ball nut 2. The operation and effects of the sixth embodiment are similar to the fifth embodiment.

Embodiment 7

Figure 12:
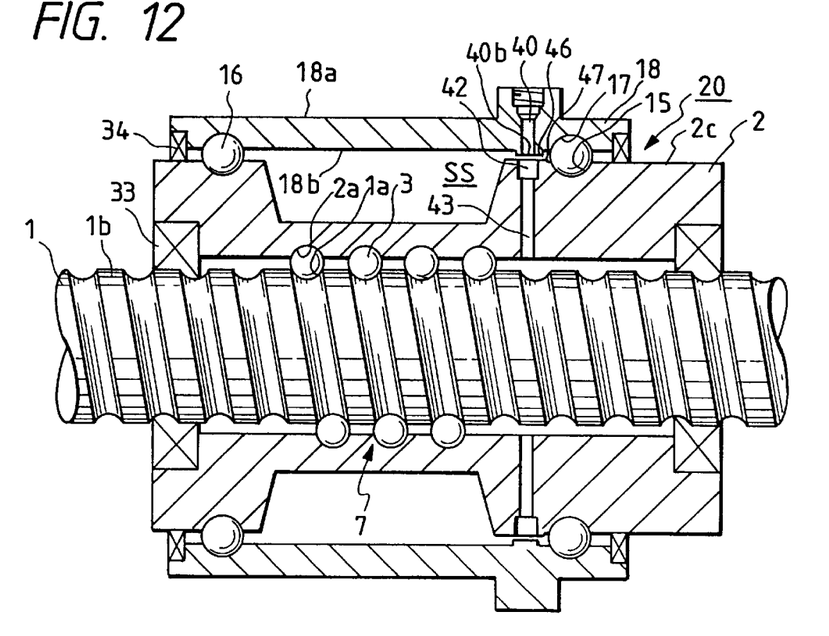
FIG. 12 is a longitudinal section view of a seventh embodiment of an oil supplying structure of a ball screw device according to the present invention.

FIG. 12 shows a seventh embodiment of an oil supplying structure of a ball screw device according to the present invention.

The seventh embodiment employs a structure which is a combination of the structures employed in the fifth and sixth embodiments. That is, in the present structure, an annularly stepped portion 46 projects inwardly on the inner peripheral is surface 18b of the fixed outer race 18 of the rolling bearing 20. In addition, an annularly stepped portion 47 projects outwardly on the outer peripheral surface 2c of the ball nut 2 to narrow further the width of the annular gap SS between the exit opening 40b of the first oil supplying hole 40 and the second oil supplying hole 43, thereby further improving the performance of the structure for supplying oil to the ball circulation portion 7 of the ball screw.

Embodiment 8

Figure 13:
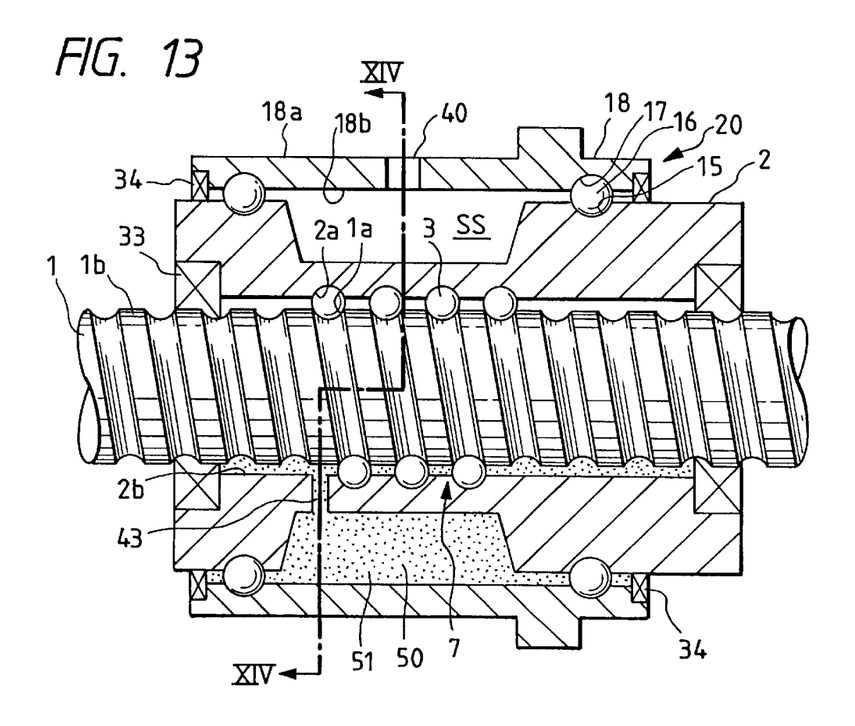
FIG. 13 is a longitudinal section view of an eighth embodiment of an oil supplying structure of a ball screw device according to the present invention.
Figure 14:
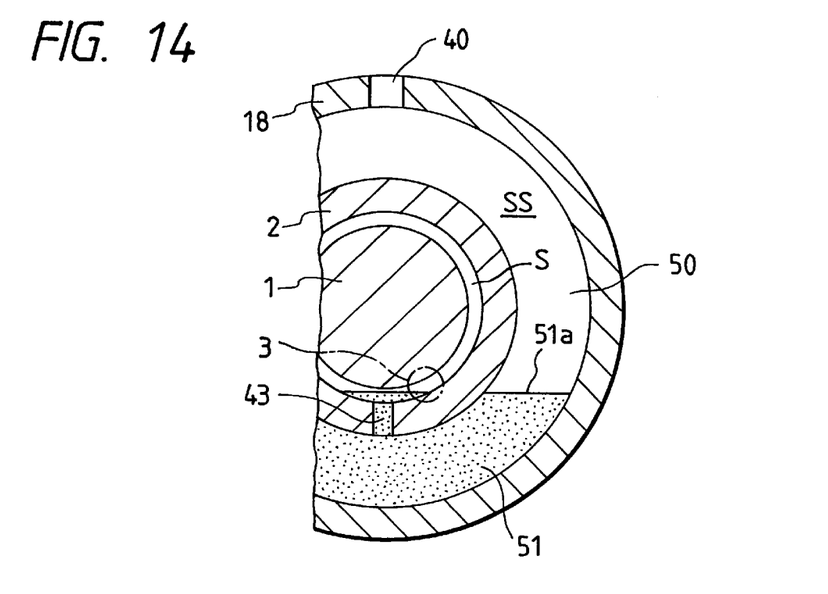
FIG. 14 is a partially omitted section view taken along the line XIV—XIV shown in FIG. 13.

FIGS. 13 and 14 show an eighth embodiment of an oil supplying structure of a ball screw device according to the present invention.

In the eighth embodiment, there is formed a recessed portion 50 in the outer periphery of the body portion of the ball nut 2 to thereby increase the volume of the annular gap SS between the fixed outer race 18 of the rolling bearing and the ball nut 2. Although equivalents of the recessed portion 50 are shown in the outer periphery of the body portion of the ball nut 2 in the third to seventh embodiments as well, the recessed portion 50 is not always necessary in these embodiments. In the eighth embodiment, the recessed portion 50 is used as an oil reservoir for storing lubricating oil. Accordingly, the first oil supplying hole 40 is formed in the fixed outer race 18, while the second oil supplying hole 43 is so formed as to pass through the ball nut 2 from the inner peripheral surface 2b to the oil reservoir 50 holding the bottom portion of the annular gap SS. The second oil supplying hole 43 communicates with the first oil supplying hole 40 through the oil reservoir 50 of the annular gap SS. That is, it is not always necessary that the first and second oil supplying holes 40 and 43 are disposed opposite to each other. The quantity of the lubricating oil 51 to be stored in the oil reservoir 50, as shown in FIG. 14, is sufficient to the such extent that an oil surface 51a can soak a part of the ball 3 in the ball circulation portion 7.

According to the eighth embodiment, oil supplying from the outside can be executed in accordance with a decrease in the oil quantity of the oil reservoir 50. Since the frequency of oil supplying from the outside is small, the oil can be supplied while the device is not in operation. Therefore, the oil supplying pipe need not be left connected all the time.

Embodiment 9

Figure 15:
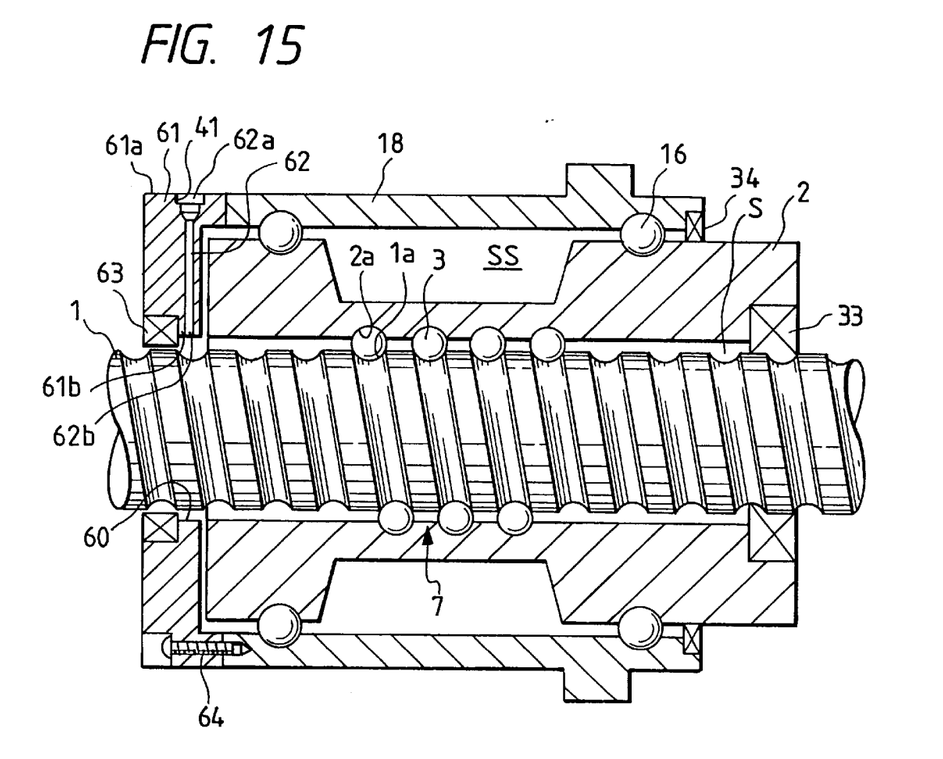
FIG. 15 is a longitudinal section view of a ninth embodiment of the oil supplying structure according to the present invention.

FIG. 15 shows a ninth embodiment of an oil supplying structure of a ball screw device according to the present invention.

The ninth embodiment is different from the third to eighth respective embodiments in that an outer cover 61 including a shaft hole 60 through which the screw shaft 1 can be inserted is mounted on one end of the fixed outer race 18 of the rolling bearing by a bolt 64, there is formed in the outer cover 61 an oil supplying hole 62 including a radially passing through hole which passes through the outer cover 61 from the external peripheral surface 61a thereof to the internal peripheral surface 61b, and the first oil supplying hole 40 of the fixed outer race 18 and the second oil supplying hole 43 of the ball nut 2 are not formed. A gap between the shaft hole 60 of the outer cover 61 and the outer surface of the screw shaft 1 is sealed by a seal member 63, while the exit opening 62b of the oil supplying hole 62 is in communication with the ball circulation portion 7 of the ball screw. Since an oil supplying pipe is mounted through a joint threadingly engaged into a screw hole 41 formed in the entrance opening 62a of the oil supplying hole 62, oil can be supplied to the ball circulation portion 7 of the ball screw even while the ball nut 2 is rotating.

In the ninth embodiment, the outer cover 61 including the oil supplying hole 62 may be mounted to the end face of the fixed outer race 18 of the rolling bearing simply as an attachment. This eliminates the need to form the first oil supplying hole 40 in the fixed outer race 18 of the rolling bearing and the second oil supplying hole 43 in the ball nut 2, and makes it easy to remodel the previously loaded parts.

In the third to ninth respective embodiments, the ball nut 2 can be driven by a drive motor installed on a table, or the ball nut 2 may be driven according to a system in which a hollow motor inserted through the screw shaft 1 is mounted onto a table by a bracket and the ball nut 2 is connected to the output part of the motor.

As has been described heretofore, in the ball screw device of a nut rotation type according to a first aspect of the present invention, as a circulation path for circulating a large number of balls which are respectively fitted between the ball screw grooves of the screw shaft and ball nut to allow the spiral movement of the ball nut with respect to the screw shaft, a circulation path of a projected tube type in which a tube is projected externally of the ball nut issued, and the outer periphery of the ball nut is rotatably supported by a support bearing. This structure eliminates the need to provide the ball circulation path within the ball nut and thus can minimize the outside diameter of the ball nut as much as possible. As a result of this, the moment of inertia of the ball nut proportionate to the biquadrate of the ball nut outside diameter can be reduced to a great extent, the response of the nut rotation with respect to the drive motor can be improved, and the table positioning accuracy can be enhanced.

Also, the use of the circulation path of a tube type can increase the freedom of selection of not only the ball nut inside diameter but also the screw shaft diameter and screw lead, with the result that the present ball screw device is able to deal easily with the production requirements for specially specified shaft diameters and screw leads.

Further, according to the first and second embodiments of the present invention, in addition to the above effects, since a pulley employed in a belt drive system is directly fastened to the ball nut by use of a bolt, when compared with the conventional fastening method in which a pulley is fastened to the ball nut through end caps, the present fastening method is improved in reliability.

According to a second aspect of the present invention, there is provided an oil supplying structure of a ball screw device in which the ball nut in threaded engagement with the fixedly supported screw shaft is rotatably held by the fixed outer race of the rolling bearing, characterized by the first oil supplying hole passing radially through the fixed outer race from the outer peripheral surface thereof to the inner peripheral surface thereof, and the second oil supplying hole passing through the ball nut from the outer peripheral surface thereof to the inner peripheral surface thereof and communicating with the first oil supplying hole through the annular gap. Due to this, the oil supplying pipe can always be left connected to the fixed outer race, and the lubricant can be supplied to the ball circulation portion even while the ball nut is rotating. This eliminates the need to stop the operation of the device or dismantle the device every oil supply and thus makes it possible to perform the oil supplying operation easily and positively.

Also, according to a third aspect of the present invention, there is provided an oil supplying mechanism of a similar ball screw device, characterized in that an outer cover including a shaft hole through which the screw shaft can be inserted is mounted on one end of the fixed outer race of the rolling bearing, and there is formed an oil supplying hole which passes through the outer cover from the external peripheral surface thereof to the inside diameter surface of the insertion hole of the screw shaft and communicates with a gap formed between the inner peripheral surface of the ball nut and the outer peripheral surface of the screw shaft. Due to this, in addition to the effects obtained in the above-mentioned oil supplying structure according to the second aspect of the present invention, there is eliminated the need to form the oil supplying holes in the fixed outer race and ball nut one by one, while the outer cover including a previously formed oil supplying hole can only be mounted on and removed from the fixed outer race as an attachment. Therefore, the present structure can be applied easily to various kinds of machines and can facilitate retrofitting to the previously loaded parts.

What is claimed is:

1. A ball screw device, comprising:

a screw shaft including a first ball screw groove formed in an outer peripheral surface thereof;

a ball nut including a second ball screw groove formed in an inner peripheral surface thereof, the second ball screw groove opposing the first ball screw groove;

a plurality of balls fitted between the first and second ball screw grooves for allowing the ball nut to move spirally with respect to the screw shaft;

a tube disposed on an outer periphery of the ball nut and including a circulation path for circulating the balls; and a support bearing for rotatably supporting the outer periphery of the ball nut, wherein the ball nut comprises a central portion having an outside diameter which is smaller than that of an end portion of the ball nut, the tube being positioned around the central portion;

wherein the ball nut comprises means for maintaining balance during a rotation of the ball nut, said means being disposed in a side of the ball nut opposite to the side on which the tube is mounted with respect to the screw shaft, and said means being a reduced thickness portion.

2. The ball screw device of claim 1, wherein the support bearing comprises both inner and outer race grooves, and a plurality of rolling elements fitted between the respective inner and outer race grooves, a first distance between the outer race grooves being set larger than a second distance between the inner race grooves so that a preload is applied to the rolling elements.

3. The ball screw device of claim 2, further comprising a driving means fixed directly to the end portion of the ball nut for rotating the ball nut.

4. The ball screw device of claim 1, wherein the support bearing comprises both inner and outer race grooves, and a plurality of rolling elements fitted between the respective inner and outer race grooves, a first distance between the outer race grooves being set larger than a second distance between the inner race grooves so that a preload is applied to the rolling elements.

5. The ball screw device of claim 1, further comprising a driving means fixed directly to an end portion of the ball nut for rotating the ball nut.

6. The ball screw device of claim 1, wherein any tube forming a circulation path for balls is disposed only on a side of the ball nut opposite the side where said means for maintaining balance is disposed.

7. The ball screw device of claim 1, wherein the screw shaft includes a third ball screw groove formed in an outer peripheral surface thereof, the ball nut includes a fourth ball screw groove formed in an inner peripheral surface thereof, the fourth ball screw groove opposing the third ball screw groove, and wherein said ball screw device further comprises:

a second plurality of balls fitted between the third and fourth ball screw grooves for allowing the ball nut to move spirally with respect to the screw shaft; and     a second tube disposed on an outer periphery of the ball nut and including a circulation path for circulating the second plurality of balls, wherein the second tube is disposed on a side of the ball nut opposite the side where said means for maintaining balance is disposed.

* * * * *